United States Patent [19]
Godfrey et al.

[11] Patent Number: 4,767,261
[45] Date of Patent: Aug. 30, 1988

[54] COOLED VANE

[75] Inventors: Colin Godfrey; Rodney C. Webster, both of Derby, England

[73] Assignee: Rolls-Royce plc, London, England

[21] Appl. No.: 7,187

[22] Filed: Jan. 27, 1987

[30] Foreign Application Priority Data
Apr. 25, 1986 [GB] United Kingdom ............... 8610181

[51] Int. Cl.⁴ .............................................. F01D 5/18
[52] U.S. Cl. ..................................... 415/115; 415/116
[58] Field of Search ................................ 415/115, 116

[56] References Cited
U.S. PATENT DOCUMENTS

| | | | |
|---|---|---|---|
| 3,628,880 | 12/1971 | Smuland | 415/115 |
| 3,782,852 | 1/1974 | Moore | 415/115 |
| 4,144,907 | 3/1979 | Schwerdtner | 415/116 |
| 4,312,624 | 1/1982 | Steinbauer et al. | 415/116 |
| 4,474,532 | 10/1984 | Pazder | 415/115 |
| 4,515,526 | 5/1985 | Levengood | 415/115 |
| 4,565,490 | 1/1986 | Rice | 415/115 |
| 4,616,976 | 10/1986 | Lings et al. | 415/115 |

FOREIGN PATENT DOCUMENTS
1400285 7/1975 United Kingdom .

Primary Examiner—Larry I. Schwartz
Attorney, Agent, or Firm—Cushman, Darby & Cushman

[57] ABSTRACT

A cooled vane suitable for a gas turbine engine is provided with an internal chamber which is fed with cooling air from the radially inner and outer ends of the vane. Cooling air supplied to the radially inner end of the vane is at a higher pressure than that supplied to the radially outer end. In order to ensure effective cooling of the vane a chordwise extending baffle is provided within the chamber to divide the chamber into radially inner and outer portions. The baffle is so configured as to permit a limited flow of cooling air from the radially inner chamber to the radially outer chamber. This facilitates effective cooling of the aerofoil of the vane in the region of the baffle.

11 Claims, 2 Drawing Sheets

COOLED VANE

BACKGROUND OF THE INVENTION

1. Field of the Invention

This invention relates to a cooled vane and in particular to a cooled vane suitable for a gas turbine engine.

2. Description of the Prior Art

Gas turbine engines are usually provided with an annular array of stator vanes immediately downstream of the engine's combustion equipment to direct combustion gases onto the first rotor stage of the engine's turbine. Such stator vanes, usually referred to as nozzle guide vanes, are exposed to very high temperatures, and as a result it is usually necessary to provide the vanes with some form of internal cooling. This is commonly achieved by directing cool air which has been tapped from the compressor section of the engine into the interior of the vane.

It is sometimes desirable to direct cooling air to both the radially inner and outer ends of the vanes in order to achieve the necessary degree of vane cooling. Frequently the pressure of the cooling air supplied to one end of the vane is higher than that supplied to the other end. If both cooling air flows are directed into a common chamber within the vane, the higher pressure cooling air flow can sometimes inhibit the lower pressure cooling air flow into the vane, which leads in turn to a reduction in cooling efficiency. Indeed the situation can arise in which the higher pressure cooling air flow prevents the lower pressure cooling air flow from flowing into the vane.

It has been proposed, for instance in UK Patent No. 1506096, to provide a baffle within the vane in order to isolate the two flows of cooling air. Whilst this is effective in ensuring that the two cooling air flows remain separate, and therefore uninfluenced by each other, there can be difficulties in ensuring that the cooling air flows in the region of the baffle do not stagnate and thereby cause localised overheating of the vane.

SUMMARY OF THE INVENTION

It is an object of the present invention to provide a cooled vane in which such localised overheating may be substantially avoided.

According to the present invention a cooled vane suitable for a gas turbine engine comprises an aerofoil cross-section portion having an internal chamber and baffle means dividing said chamber into first and second portions, which portions are in operation supplied with first and second cooling fluid flows respectively, said first cooling fluid flow being at a higher pressure than said second cooling fluid flow, said aerofoil portion having apertures therein to permit exhaustion of cooling fluid from both of said chamber portions to facilitate the cooling of said aerofoil portion, said baffle means being so configured as to permit a limited flow of cooling fluid of higher pressure from said first chamber portion to said second chamber portion, which flow is insufficient to raise the cooling fluid pressure in said second chamber portion to a level which equals or exceeds the pressure of said second cooling fluid flow but which is sufficient to provide a cooling fluid flow in the region of said baffle means to provide cooling of said aerofoil portion in the region of said baffle means.

BRIEF DESCRIPTION OF THE DRAWINGS

The invention will now be described by way of example with reference to the accompanying drawings in which.

DETAILED DESCRIPTION OF THE PREFERRED EMBODIMENTS

Figure 1:
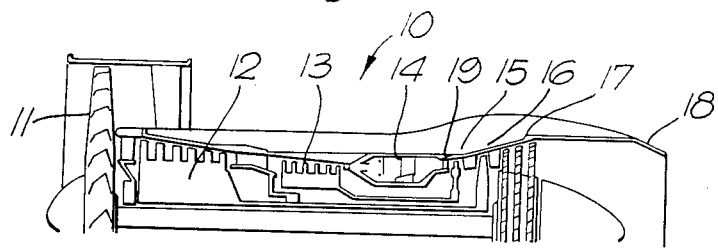
FIG. 1 is a partially sectioned side view of a ducted fan gas turbine engine incorporating cooled vanes in accordance with the present invention.

With reference to FIG. 1 a ducted fan gas turbine engine generally indicated at 10 comprises a propulsive ducted fan 11, intermediate and high pressure compressor sections 12 and 13 respectively, combustion equipment 14, high, intermediate and low pressure turbines 15, 16 and 17 respectively and a propulsion nozzle 18. The ducted fan 11 is interconnected with the low pressure turbine 17, the intermediate compressor 12 is interconnected with the intermediate pressure turbine 16 and the high pressure compressor 13 is interconnected with the high pressure turbine 15. The engine functions in the normal manner in that air compressed by the ducted fan 11 and the intermediate and high pressure compressors 12 and 13 is mixed with fuel and the mixture combusted in the combustion equipment 14. The combustion products then expand through the high, intermediate and low pressure turbines 15,16 and 17 before being exhausted through the propulsion nozzle 17 to provide propulsive thrust, which is additional to that provided by the ducted fan 11.

Figure 2:
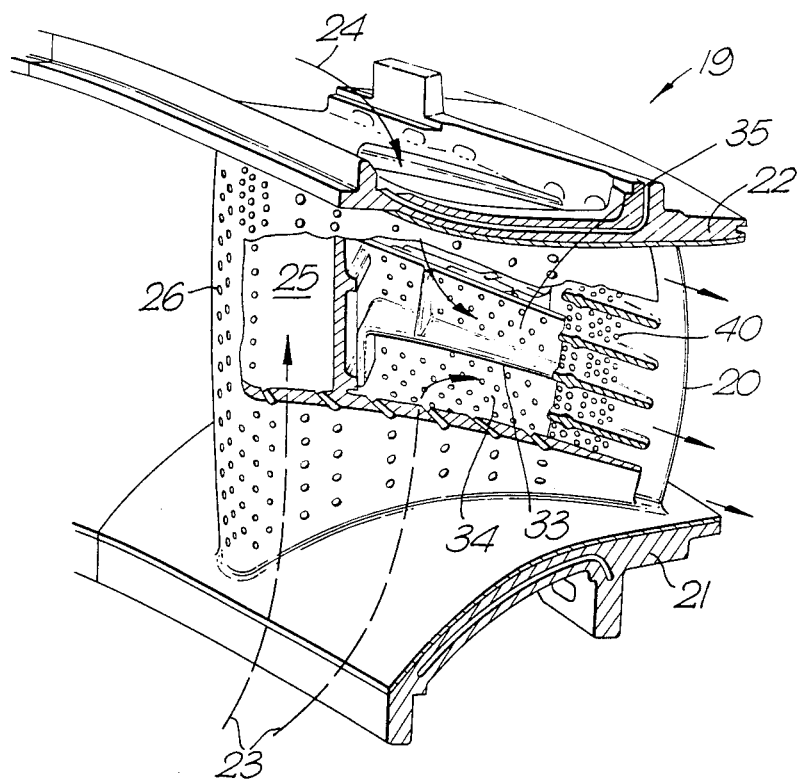
FIG. 2 is a partially broken away perspective view of a cooled vane in accordance with the present invention.

Immediately downstream of the combustion equipment 14 there is provided an annular array of equally spaced apart generally similar radially extending nozzle guide vanes 19 one of which can be seen more clearly in FIG. 2. Each nozzle guide vane 19 comprises an aerofoil cross-section portion 20 having radially inner and outer platforms 21 and 22 integral therewith. The platforms 21 and 22 of adjacent nozzle guide vanes 19 cooperate with each other to define the radially inner and outer walls respectively of a portion of the gas passage through the high pressure turbine 15. The aerofoil portions 20 serve to direct combustion gases exhausted from the combustion equipment 14 onto the rotor blades of the high pressure turbine 15.

Each aerofoil portion 20 is adapted to be cooled by cooling air delivered to both its radially inner and outer ends as indicated by the arrows 23 and 24. The cooling air is tapped from the high pressure compressor 13 in the conventional manner.

Figure 3:
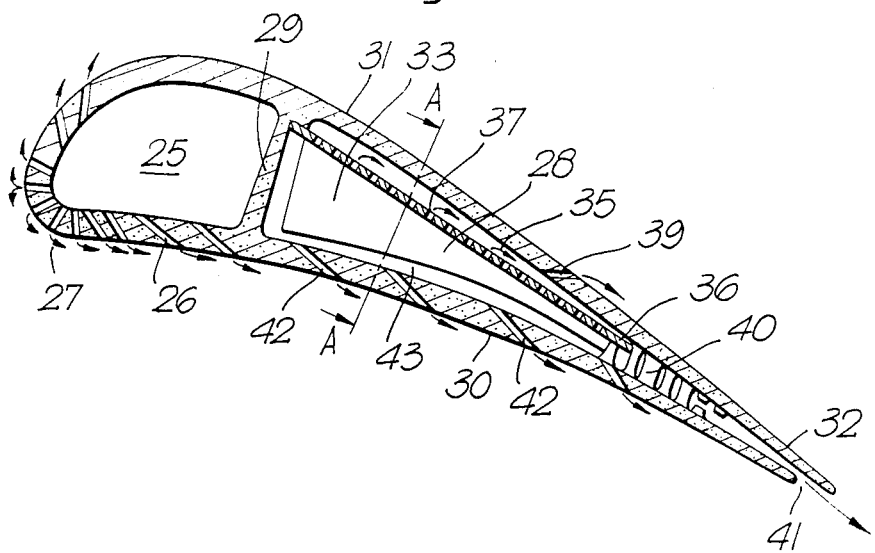
FIG. 3 is a sectioned view in a radial direction of the aerofoil portion of the vane shown in FIG. 2.

Cooling air delivered to the radially inner end of the aerofoil portion 20 is divided into two flows. The first flow is directed into a blind passage 25 adjacent the leading edge of the aerofoil portion 20. A plurality of apertures 26 interconnect the passage 25 with the external surface of the aerofoil portion 20 as can be seen in FIG. 3 so that air directed into the passage 25 flows through the apertures 26 to provide a film cooling of the external surface at the leading edge region of the aerofoil portion 19 as indicated by the arrows 27. The remainder of the cooling air delivered to the radially inner end of the aerofoil portion 20 is directed into a spanwise extending chamber 28 which is separated from the passage 25 by a web 29 interconnecting the convex and concave flanks 30 and 31 and extends to the trailing edge region 32 of the aerofoil portion 20.

Cooling air delivered to the radially outer end of the aerofoil portion 20 as indicated by the arrow 24 is also directed into the chamber 28 and is at a lower pressure than that delivered to the radially inner end. In order to ensure that the cooling air delivered to the radially outer end of the aerofoil portion 20 is permitted to flow into the chamber 28 uninhibited by the higher pressure cooling air flow 23 a chord-wise extending baffle 33 is located within the chamber 28 at an approximately mid-span location to provide a division between the radially inner and outer regions of the chamber 28 and thereby define radially inner and outer chamber portions 34 and 35.

Figure 4:
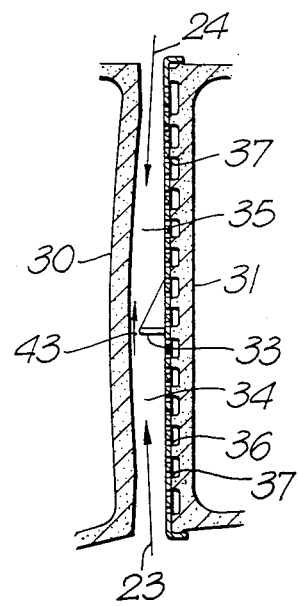
FIG. 4 is a view of section line A—A of FIG. 3.

The baffle 33 is mounted on a plate member 36 which, as can be seen in FIGS. 3 and 4, is located within the chamber 28 adjacent the convex flank 31 of the aerofoil portion 20. The plate member 36 is spaced apart from the internal wall of convex flank 31 and has a plurality of apertures 37 in it. A proportion of the cooling air delivered to the chamber portions 34 and 35 passes through the apertures 37 in the plate member 36 as indicated by the arrows 38 to provide impingement cooling of the internal surface of the convex flank 31. After providing convective cooling of the convex flank 31, that cooling air is then exhausted from the aerofoil portion 20 interior through apertures 39 in the convex flank 31 to provide film cooling of the external surface of the trailing edge region 32 of the convex flank 31. A further proportion of the cooling air delivered to the chamber portions 34 and 35 passes between pedestals 40 provided on the internal surfaces of both the convex flank 31 and the concave flank 30 before being exhausted from the aerofoil portion interior 20 through a span-wise extending slot 41 provided in the trailing edge region 32. The remainder of the cooling air delivered to the chamber portions 34 and 35 is exhausted through a plurality of apertures 42 provided in the concave flank 30 of the aerofoil portion 20 so as to provide film cooling of the external surface of the concave flank 30.

The baffle 33, as can be seen in FIG. 4, does not extend completely across the chamber 28 so that a gap 43 is defined between the baffle 33 and the opposite internal wall of the concave flank 30. The baffle 33 is so configured that the gap 43 is sufficiently large for higher pressure cooling air within the radially inner chamber portion 34 to flow into the lower pressure region of the radially outer chamber portion 35. However the configuration of the baffle 33 is such that the amount of cooling air permitted to flow from the radially inner chamber portion 34 to the radially outer chamber portion 35 is insufficient to raise the air pressure within the the radially outer chamber portion 35 to a level which is equal to or higher than that of the cooling air flow delivered to the radially outer chamber portion 35. This flow of cooling air through the gap 43 ensures that there is no stagnation of cooling air in the region of the baffle 33 so that adequate cooling of the aerofoil portion 20 in the region of the baffle 33 is achieved.

A further benefit enjoyed by permitting a limited flow of cooling air between the chamber portions 34 and 35 is that in the event of fluctuation in the flow of cooling air to the chamber portion 34 and 35, a certain degree of cooling air flow stabilization will occur.

Although the present invention has been described with reference to a nozzle guide vane provided with a chordwise extending baffle 33 it will be appreciated that other baffle configurations could be utilised if so desired. Moreover although the baffle 33 has been depicted as being situated in a mid-span location, it may be desirable in certain circumstances to position it at a location other than the mid-space position.

It will also be appreciated that although the present invention has been described with reference to a cooled vane having a separate cooling air passage 25 adjacent its leading edge, the present invention is also applicable to cooled vanes which are not provided with such a passage. In such circumstances, the baffle 33 would extend to the leading edge region of the vane.

We claim:

1. A cooled vane suitable for a gas turbine engine comprising:

an aerofoil cross-section portion having an internal chamber; and baffle means for dividing said chamber into first and second portions, which portions are in operation supplied with first and second cooling fluid flows respectively, the first cooling fluid flow being at a higher pressure than the second cooling fluid flow, said aerofoil portion having apertures defined therein to permit the exhaustion of cooling fluid from both of said chamber portions to facilitate the cooling of said aerofoil portion, said baffle means being configured to permit a limited flow of cooling fluid of higher pressure from said first chamber portion to said second chamber portion, which flow is insufficient to raise the cooling fluid pressure in said second chamber portion to a level which equals or exceeds the pressure of said second cooling fluid flow but which is sufficient to provide a cooling fluid flow in the region of said baffle means to provide cooling of said aerofoil portion in the region of said baffle means.

2. A cooled vane as claimed in claim 1 wherein said chamber is generally span-wise extending.

3. A cooled vane as claimed in claim 1, wherein said baffle means is generally chordwise extending.

4. A cooled vane as claimed in claim 1 wherein said chamber contains a plate member having a plurality of apertures therein, said plate member being situated adjacent an internal wall of said aerofoil portion in spaced apart relationship therewith so that cooling fluid exhausted through said apertures impinges upon said aerofoil portion internal wall to provide cooling thereof.

5. A cooled vane as claimed in claim 4 wherein said plate member is adjacent the convex flank of said aerofoil portion.

6. A cooled vane as claimed in claim 4 wherein said baffle means is attached to said plate member.

7. A cooled vane as claimed in claim 6 wherein said baffle means is so configured as to be in spaced apart relationship with the internal wall of the concave flank of said aerofoil portion so as to permit said cooling fluid flow in the region of said baffle means to provide cooling of the concave flank of said aerofoil portion in the region of said baffle means.

8. A cooled vane as claimed in claim 1 wherein said aerofoil portion is provided with a plurality of apertures interconnecting said chamber with the external surface of said aerofoil portion so that cooling fluid exhausted from said apertures provides film cooling of said aerofoil portion external surface.

9. A cooled vane as claimed in claim 1 wherein said aerofoil portion includes a trailing edge region having a span-wise extending slot therein which is in communication with said chamber so as permit the exhaustion of cooling fluid from said chamber to the exterior of said vane through said trailing edge slot and thereby provide cooling of said trailing edge region.

10. A cooled vane as claimed in claim 1 wherein said first and second cooling fluid flows are in operation respectively directed to opposite span-wise extents of said aerofoil portion.

11. A cooled vane as claimed in claim 1 wherein said aerofoil portion is adapted to be supplied with a third cooling fluid flow, said aerofoil portion being provided with an internal passage adjacent its leading edge region to receive said third cooling fluid flow, a plurality of apertures being provided to interconnect said leading edge passage with the external surface of said aerofoil portion so the cooling fluid operational exhausted therefrom provides film cooling of said leading edge region.

* * * * *